United States Patent
Sharma et al.

(10) Patent No.: US 11,797,387 B2
(45) Date of Patent: Oct. 24, 2023

(54) RAID STRIPE ALLOCATION BASED ON MEMORY DEVICE HEALTH

(71) Applicant: Western Digital Technologies, Inc., San Jose, CA (US)

(72) Inventors: Amit Sharma, Bengaluru (IN); Dinesh Kumar Agarwal, Bangalore (IN); Abhinandan Venugopal, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 284 days.

(21) Appl. No.: 16/909,527

(22) Filed: Jun. 23, 2020

(65) Prior Publication Data

US 2021/0397517 A1 Dec. 23, 2021

(51) Int. Cl.
*G06F 11/00* (2006.01)
*G06F 11/10* (2006.01)
*G06F 11/07* (2006.01)
*G06F 3/06* (2006.01)
*G06F 11/30* (2006.01)

(52) U.S. Cl.
CPC ........ *G06F 11/1096* (2013.01); *G06F 3/0619* (2013.01); *G06F 3/0631* (2013.01); *G06F 3/0689* (2013.01); *G06F 11/076* (2013.01); *G06F 11/3034* (2013.01)

(58) Field of Classification Search
CPC .. G06F 11/1096; G06F 3/0619; G06F 3/0631; G06F 3/0689; G06F 11/076; G06F 11/3034
See application file for complete search history.

(56) References Cited

U.S. PATENT DOCUMENTS

| | | | |
|---|---|---|---|
| 11,275,513 B2* | 3/2022 | Dalmatov | G06F 3/0689 |
| 11,294,569 B2* | 4/2022 | Han | G06F 3/0689 |
| 2005/0022052 A1 | 1/2005 | Moulton et al. | |
| 2011/0289261 A1 | 11/2011 | Candelaria | |
| 2012/0317356 A1 | 12/2012 | Ignatowski | |
| 2013/0332420 A1 | 12/2013 | Ha | |
| 2016/0103630 A1* | 4/2016 | Shen | G06F 11/008 714/37 |
| 2017/0003880 A1* | 1/2017 | Fisher | G06F 3/0655 |
| 2018/0165169 A1* | 6/2018 | Camp | G06F 3/064 |
| 2018/0364911 A1* | 12/2018 | Gupta | G06F 3/0622 |
| 2019/0050313 A1* | 2/2019 | Mitra | G06F 11/0709 |
| 2019/0108888 A1* | 4/2019 | Sarkar | G06F 3/0616 |
| 2019/0332295 A1* | 10/2019 | Hsu | G06F 3/0631 |

(Continued)

OTHER PUBLICATIONS

International Search Report and Written Opinion for International Application No. PCT/US2022/016780, dated Jun. 2, 2022, 11 pgs.

*Primary Examiner* — Loan L. T. Truong
(74) *Attorney, Agent, or Firm* — PATENT LAW WORKS LLP

(57) ABSTRACT

Example storage systems, storage devices, and methods provide dynamic redundant array of independent disks (RAID) stripe allocation based on memory device health conditions. A device health condition is assigned to each data chunk of a RAID stripe before the data chunk is sent to the target storage device. The write command indicates the device health condition and the receiving storage device selects the storage location for the data chunk corresponding to the device health condition.

20 Claims, 9 Drawing Sheets

(56) References Cited

U.S. PATENT DOCUMENTS

| | | | |
|---|---|---|---|
| 2019/0391889 A1* | 12/2019 | Luo | G06F 11/2094 |
| 2021/0149777 A1* | 5/2021 | Gao | G06F 11/079 |
| 2021/0334157 A1* | 10/2021 | Kannan | G06F 3/0619 |
| 2022/0357857 A1* | 11/2022 | Kannan | G06F 3/0689 |

* cited by examiner

RAID STRIPE ALLOCATION BASED ON MEMORY DEVICE HEALTH

TECHNICAL FIELD

The present disclosure generally relates to data storage, and in a more particular example, to redundant array of independent disks (RAID) configurations for solid-state memory devices.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Such large-scale storage systems generally distribute the stored data objects in the object storage system over multiple storage elements, such as for example disk drives (solid-state drives, hard disk drives, hybrid drives, tape drives, etc.), or multiple components such as storage nodes comprising a plurality of such storage elements. However, as the number of storage elements in such a distributed object storage system increase, equally the probability of failure of one or more of these storage elements increases. To cope with this issue, distributed object storage system generally use some level of redundancy, which allows the system to cope with a failure of one or more storage elements without data loss. For example, such storage systems may use some combination of object replication and RAID configurations within and across storage nodes.

Some storage systems may be arranged in an array of drives interconnected by a common communication fabric and, in many cases, controlled by a storage controller, RAID controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives). After a drive has failed, the RAID configuration may support a rebuild process to a replacement drive, such as a hot spare, or across existing drives with unused capacity.

Solid-state drives based on non-volatile memory devices may have unique wear, reliability, and failure characteristics that may be tracked and managed as health data at various levels, including device, die, page, line, and other levels. Many RAID controllers and RAID schemes treat SSDs as uniform storage devices and fail to take into account the varying health characteristics of the subunits therein when allocating RAID stripes.

A need exists for at least improved allocation of RAID stripes and RAID configurations based on memory device health. For example, when assigning chunks in a RAID stripe, a need exists to consider the device health of storage locations within the target storage devices.

SUMMARY

Various aspects for RAID stripe allocation by storage systems, particularly, using device health data for memory devices to determine data chunk storage locations are described.

One general aspect includes a storage system that includes a plurality of storage devices configured in a redundant array of independent disks (RAID) configuration and a RAID controller configured to: determine a stripe set of storage devices from the plurality of storage devices to receive a target RAID stripe, where each storage device of the stripe set receives a data chunk corresponding to a portion of the target RAID stripe; assign a device health condition for each data chunk of the target RAID stripe; and send, to each storage device in the stripe set, a write command indicating the device health condition for the data chunk, where each storage device in the stripe set is configured to store the received data chunk in a storage location corresponding to the device health condition.

Implementations may include one or more of the following features. The RAID controller may be further configured to: receive device health data for a plurality of storage locations in each storage device of the plurality of storage devices; determine a first set of available storage locations in each storage device of the plurality of storage devices meeting a first health condition; and determine a second set of available storage locations in each storage device of the plurality of storage devices meeting a second health condition. Assigning the device health condition for each data chunk of the target RAID stripe may be based on selecting, for the target RAID stripe, a minimum number of available storage locations meeting the first health condition. The RAID controller may be further configured to: determine a maximum number of allowable failures for the RAID configuration; and determine the minimum number of available storage locations for the target RAID stripe meeting the first health condition by subtracting the maximum number of allowable failures from a number of storage devices in the stripe set. Assigning the device health condition for each data chunk of the target RAID stripe may include: determining whether at least one storage device in the stripe set includes an available storage location in the second set of available storage locations; and selecting, responsive to determining at least one storage device in the stripe set includes a storage location in the second set of available storage locations, at least one storage device to receive a device health condition indicator for the second health condition. The RAID controller may be further configured to determine allocations of available storage locations across the plurality of storage devices that meet the minimum number of available storage locations for the target RAID stripe meeting the first health condition. Assigning the device health condition for each data chunk of the target RAID stripe may further include: selecting a target allocation from the determined allocations of available storage locations; and assigning each data chunk to a storage device in the stripe set based on the target allocation. Assigning the device health condition for each data chunk of the target raid stripe may further include determining, based on the target allocation, a device health condition indicator for each storage device in the stripe set and corresponding data chunk. The write command sent to each storage device in the stripe set may include the device health condition indicator for that storage device and corresponding data chunk. The RAID controller may be further configured to determine, based on the assigned device health conditions for the data chunks in the target RAID stripe, a target parity configuration for the target RAID stripe. Determining the target parity configuration may include selecting the target parity configuration from a plurality of parity configurations and each parity configuration of the plurality of parity configurations may correspond to a different allocation of device health conditions for the data chunks. The write commands may be configured according to the target parity configuration and each storage device in the stripe set may be further configured to store the received data chunk according to the target parity configuration. Each storage device of the plurality of storage devices may include: a plurality of memory devices including a plurality of storage locations; a memory health monitor configured to monitor at least one health value for each storage location of the plurality of storage locations; and a storage management interface configured to report, to the RAID controller, health condition data for each storage location of the plurality of storage locations. Assigning the device health condition for each data chunk of the target raid stripe may be based on the health condition data from each storage device of the plurality of storage devices. Each storage device of the plurality of storage devices may further include a heath function configured to determine, based on the at least one health value for each storage location, a health condition value for each storage location and the health condition data may include: aggregate values of available storage locations with a first health condition value; and aggregate values of available storage locations with a second health condition value. The at least one health value may include at least one health value type selected from a program-erase cycle value, a program loop counter value, a bit error rate value, and a soft bit/hard bit value. The health function may be further configured to determine the health condition value for each storage location based on: evaluating the at least one health value against a health threshold for a corresponding health value type; and aggregating health condition values across a plurality of storage units corresponding to a storage location. The memory health monitor may be further configured to monitor the at least one health value for each storage unit of the plurality of storage units. An aggregate size of the plurality of storage units corresponding to a storage location may be at least a chunk size of a target data chunk of the data chunks in the target RAID stripe. Each storage unit of the plurality of storage units may correspond to a predetermined storage unit type selected from a word line, an erase block, block zone, and memory die. Each storage device of the plurality of storage devices may further include a storage manager configured to select, based on the device health condition in the write command, the storage location for the received data chunk.

Another general aspect includes a computer-based method that includes: determining a stripe set of storage devices from a plurality of storage devices configured to receive a target redundant array of independent disks (RAID) stripe, where each storage device of the stripe set receives a data chunk corresponding to a portion of the target RAID stripe; assigning a device health condition for each data chunk of the target RAID stripe; and sending, to each storage device in the stripe set, a write command indicating the device health condition for the data chunk, where each storage device in the stripe set is configured to store the received data chunk in a storage location corresponding to the device health condition.

Implementations may include one or more of the following features. The computer-based method may include: receiving device health data for a plurality of storage locations in each storage device of the plurality of storage devices; determining a first set of available storage locations in each storage device of the plurality of storage devices meeting a first health condition; determining a second set of available storage locations in each storage device of the plurality of storage devices meeting a second health condition; and selecting, for the target RAID stripe, a minimum number of available storage locations meeting the first health condition, where assigning the device health condition for each data chunk is based on selecting the minimum number of available storage locations meeting the first health condition. The computer-based method may include: determining, based on a RAID configuration for the plurality of storage devices, a maximum number of allowable failures for the target RAID stripe; and determining the minimum number of available storage locations meeting the first health condition by subtracting the maximum number of allowable failures from a number of storage devices in the stripe set. Assigning the device health condition for each data chunk of the target RAID stripe may include: determining whether at least one storage device in the stripe set includes an available storage location in the second set of available storage locations; and selecting, responsive to determining at least one storage device in the stripe set includes a storage location in the second set of available storage locations, at least one storage device to receive a device health condition indicator for the second health condition. The computer-based method may further include determining allocations of available storage locations across the plurality of storage devices that meet the minimum number of available storage locations meeting the first health condition, where assigning the device health condition for each data chunk of the target RAID stripe further includes: selecting a target allocation from the determined allocations of available storage locations; and assigning each data chunk to a storage device in the stripe set based on the target allocation. Assigning the device health condition for each data chunk of the target RAID stripe may further include determining, based on the target allocation, a device health condition indicator for each storage device in the stripe set and corresponding data chunk and the write command sent to each storage device in the stripe set may include the device health condition indicator for that storage device and corresponding data chunk. The computer-based method may further include determining, based on the assigned device health conditions for the data chunks in the target RAID stripe, a target parity configuration for the target RAID stripe, where determining the target parity configuration includes selecting the target parity configuration from a plurality of parity configurations; each parity configuration of the plurality of parity configurations corresponds to a different allocation of device health conditions for the data chunks; the write commands are configured according to the target parity configuration; and each storage device in the stripe set is further configured to store the received data chunk according to the target parity configuration. The computer-based method may further include monitoring at least one health value for each storage location of the plurality of storage locations in each storage device of the plurality of storage devices and reporting, from the plurality of storage devices, health condition data for each storage location of the plurality of storage locations in each storage device of the plurality of storage devices, where assigning the device health condition for each data chunk of the target RAID stripe is based on the health condition data from each storage device of the plurality of storage devices. The computer-based method may further include determining, based on the at least one health value for each storage location, a health condition value for each storage location, where the health condition data includes, for each storage device of the plurality of storage devices: aggregate values of available storage locations with a first health condition value; and aggregate values of available storage locations with a second health condition value.

Still another general aspect includes a system that includes: a plurality of storage devices configured in a redundant array of independent disks (RAID) configuration; means for determining a stripe set of storage devices from the plurality of storage devices to receive a target RAID stripe, where each storage device of the stripe set receives a data chunk corresponding to a portion of the target RAID stripe; means for assigning a device health condition for each data chunk of the target RAID stripe; and means for sending, to each storage device in the stripe set, a write command indicating the device health condition for the data chunk, where each storage device in the stripe set is configured to store the received data chunk in a storage location corresponding to the device health condition.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the allocation of RAID stripes across memory devices based on memory device health conditions. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
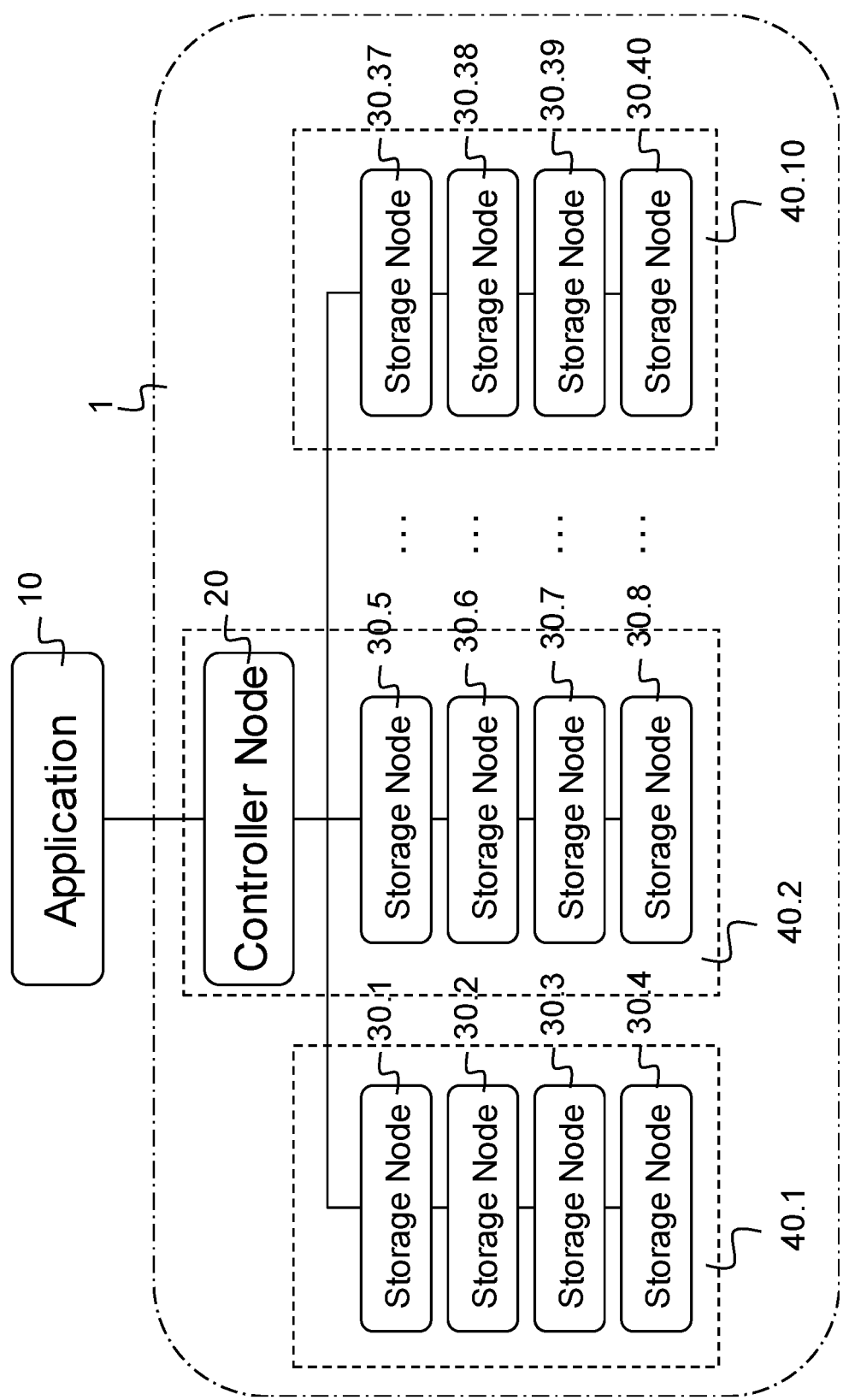
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.$n$ for accessing data objects through one or more controller or access nodes 20.1-10.$n$. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of controller or access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.$n$ comprising standard dimensions. Exemplary access nodes 20 and storage nodes 30 may be dimensioned to take up a single unit of such racks 40, which is generally referred to as 1 U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

In some embodiments, clients 10, access nodes 20, and/or storage nodes 30 may be interconnected using one or more network fabric protocols and related physical and logical network interface. For example, storage nodes may include non-volatile memory express (NVMe) compliant storage devices, such as solid-state drives (SSD) connected via peripheral component interconnect express (PCIe) physical interfaces. Storage nodes 30 may include NVMe interface controllers to connect to a wider network infrastructure, such as a Fibre Channel or Ethernet network that supports NVMe traffic.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location. They are often geographically dispersed across different data centers, for example, rack 40.1 can be located at a data center in Europe and 40.n at a data center in the USA.

Figure 2:
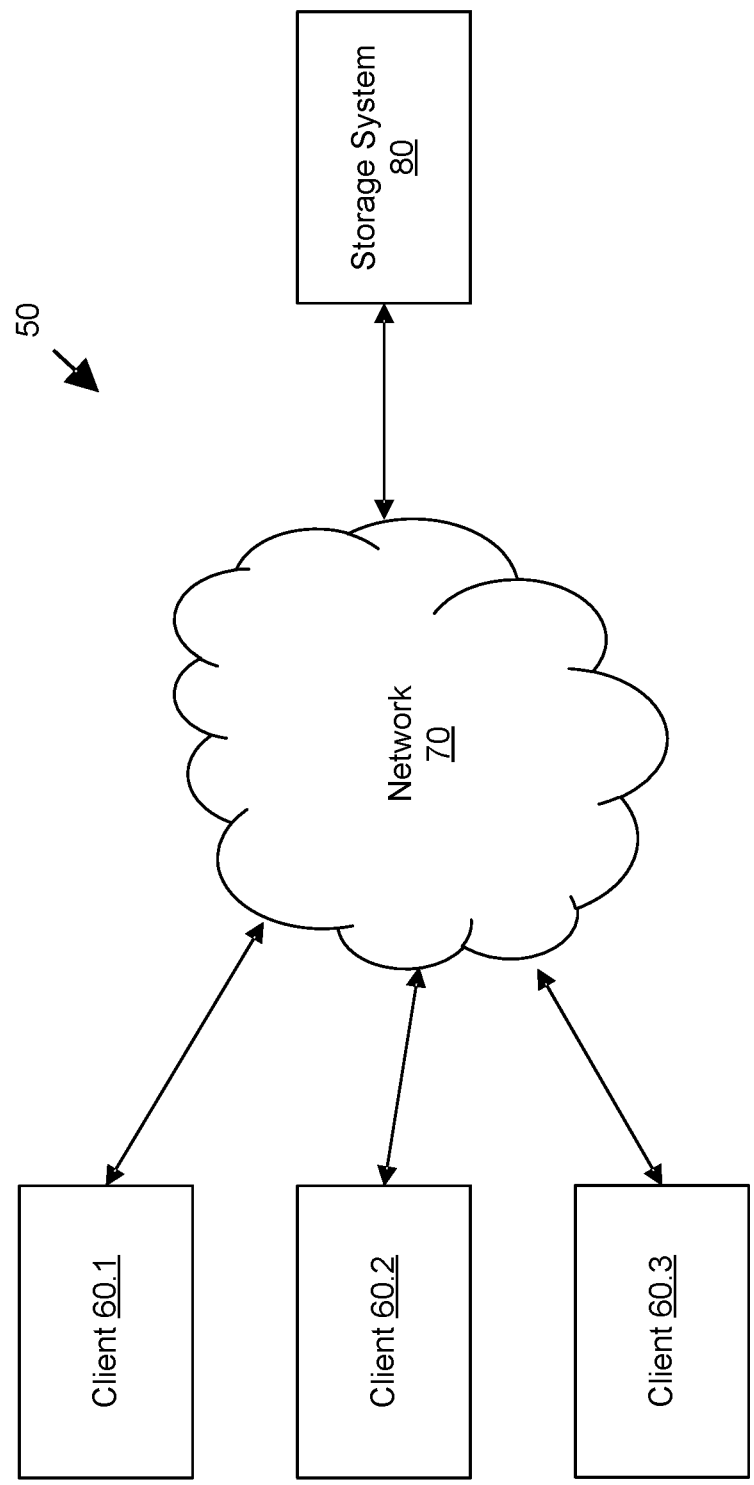
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
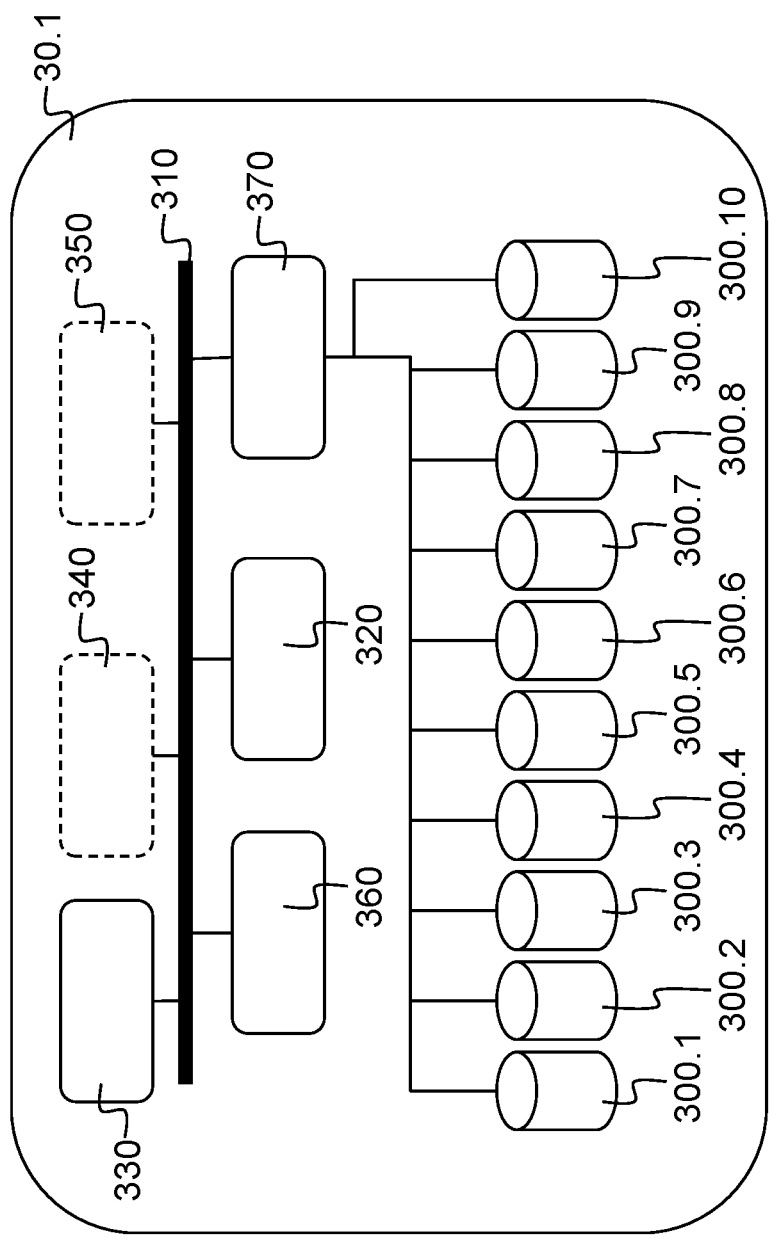
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface, for example a SATA interface, a small computer system interface (SCSI), or a PCIe/NVMe interface for connecting bus 310 to one or more storage elements 300, such as one or more local disks, for example, 6 terabyte (TB) SATA disk drives, or 2 TB NVMe SSDs, and control the reading and writing of data to/from these storage elements 300. In one exemplary embodiment as shown in FIG. 3, such a storage node 30.1 could comprise ten 6 TB SATA disk drives as storage elements 300.1-300.10 and in this way storage node 30.1 would provide a storage capacity of 60 TB to the distributed storage system 1. According to the exemplary embodiment of FIG. 1 and in the event that storage nodes 30.2-30.40 are identical to storage node 30.1 and each comprise a storage capacity of 60 TB, the distributed storage system 1 would then have a total storage capacity of 2400 TB. Similarly, storage node 30.1 could comprise ten 2 TB SSDs as storage elements 300.1-300.10 and provide 20 TB to distributed storage system 1, resulting in a total storage capacity of 800 TB. In some configuration, distributed storage system 1 may include a mix of storage nodes with different configurations of SSDs and HDDs of varying capacities.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300. These storage elements 300 may provide redundant storage in one or more RAID configurations. For example, the ten storage elements 300 in storage node 30.1 may be configured as a storage array implementing a RAID group across the ten storage devices.

As shown in FIG. 3 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
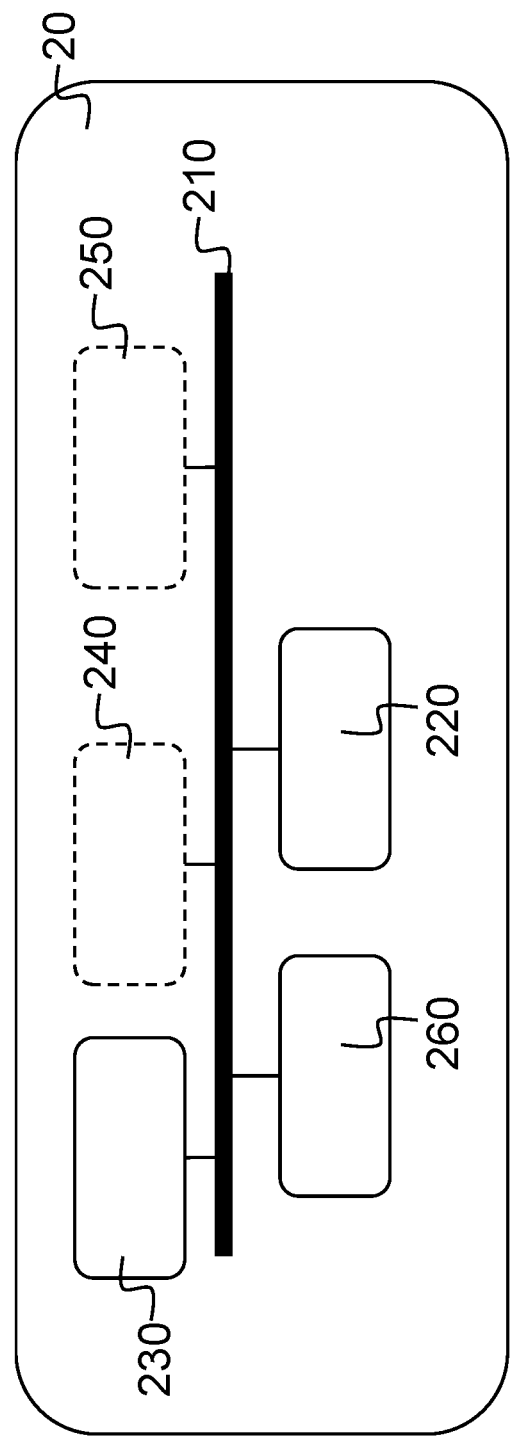
FIG. 4 schematically illustrates an example of a controller node or access node of the distributed storage system of FIG. 1.

FIG. 4 shows a schematic representation of an embodiment of the controller or access node 20. Controller node 20 may include storage controller node functions and/or file system interface functions for client systems using file system protocols to access data stored in data objects in storage nodes 30. In some embodiments, controller node 20 may be configured as a RAID controller. Controller node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller node 20 such as for example two 10 Gb Ethernet interfaces.

According to an alternative embodiment, controller node 20 could have an identical design as a storage node 30, or according to still a further alternative embodiment one of the storage nodes 30 of the distributed object storage system could perform both the function of an controller node 20 and a storage node 30. According to still further embodiments, the components of the controller node 20 as described in more detail below could be distributed amongst a plurality of controller nodes 20 and/or storage nodes 30 in any suitable way. According to still a further embodiment, the clients 10 may run an controller node 20. According to still further embodiments, controller node 20 may be embodied in separate controller nodes, access nodes, and/or interface nodes with or without redundancy among the controller nodes, access nodes, and/or interface nodes.

Figure 5:
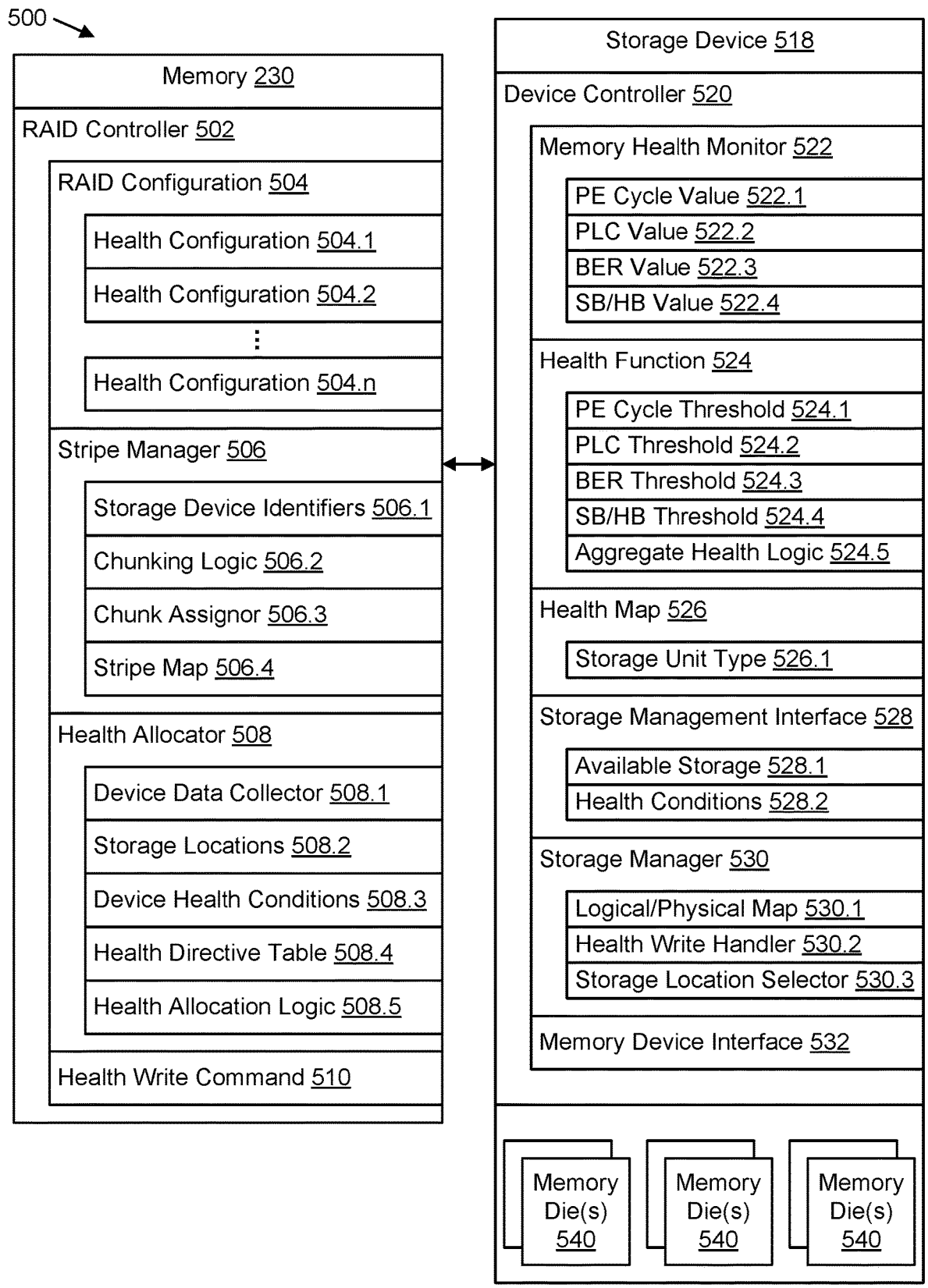
FIG. 5 schematically illustrates some example elements of a storage system for the distributed storage system of FIG. 1.

FIG. 5 schematically shows selected modules of a RAID controller, storage node, and/or one or more storage devices contained therein. Storage system 500 may incorporate elements and configurations similar to those shown in FIGS. 1-4. For example, storage system 500 may include a RAID controller 502 configured in memory 230 of a controller node 20. Storage system 500 may include one or more storage nodes 30 including solid state drives configured like storage device 518. In addition to the modules shown, each storage device 518 may include their own bus interface, processor, and memory (not shown) supporting device controller 520. For example, the modules or subsystems of device controller 520 may be instantiated in storage device memory and executed by one or more storage device processors.

Storage system 500 may include a plurality of modules or subsystems that are stored and/or instantiated in memory 230 for execution by processor 220 (shown in FIG. 4). For example, memory 230 may enable controller 20 to be configured as a RAID controller 502, among other functions. RAID controller 502 may be embodied in the plurality of modules and subsystems shown in FIG. 5.

RAID controller 502 may be configured to manage and allocate data chunks in redundant and/or parity protected RAID stripes across a RAID group of storage devices and rebuild a failed storage device in response to a storage device failure. For example, RAID controller 502 may be a hardware or software RAID controller for implementing at least one RAID group among two or more storage devices, such as drives in a storage array or storage node. RAID controller 502 may organize a group of physical storage devices into a plurality of logical recovery units distributed among the storage devices, such as RAID stripes. For example, a data unit, such as a block, may be divided among a number of the storage devices in the RAID group to define a RAID stripe. The set of storage devices that receive portions of a target RAID stripe may be a stripe set or stripe group. The portion of the RAID stripe sent to each storage device in the stripe set may be a data chunk. Data chunks may be of a uniform and predetermined size across each storage device in the stripe set. In some embodiments, parity data may also be calculated and stored in at least one of the storage devices as part of the stripe. In some embodiments, data chunks may be mirrored for increased resiliency.

RAID controller 502 may include a plurality of functional modules instantiated in memory 230 for execution by processor 220. For example, RAID controller 502 may include a RAID configuration 504 configured to define and manage the RAID configuration for one or more RAID groups controlled by RAID controller 502. RAID controller 502 may include a stripe manager 506 configured to manage the selection and allocation of data chunks for each RAID stripe. RAID controller 502 may include a health allocator 508 for using memory device health condition data to allocate health conditions for each data chunk. RAID controller 502 may include a health write command 510 to send each data chunk to its assigned storage device with a health condition identifier for determining the memory device health condition of the storage location receiving the data chunk.

RAID configuration 504 may include a set of functions, parameters, and/or data structures for storing and managing RAID configurations for one or more RAID groups. For example, RAID configuration 504 may identify the RAID-level, storage devices in the RAID group, RAID stripe allocation and depth, data chunk size and chunking algorithm, parity and/or mirroring processes, and/or specific algorithms for implementing these or other RAID-related features. In some embodiments, RAID configuration 504 may include a user interface or API for receiving, modifying, deleting, or otherwise configuring RAID configuration parameters in RAID configuration 504. In some embodiments, RAID configuration 504 may be stored in one or more configuration files, configuration tables, or similar data structures for RAID configuration parameters representing one or more RAID configurations.

In some embodiments, RAID configuration 504 may identify a set of health configurations 504.1-504.n. For example, health configuration 504.1 may include a default RAID configuration for a RAID group, assuming a normal distribution of memory device health conditions among the storage devices in the RAID group, including a base parity level. Health configuration 504.2 may include a low health RAID configuration for RAID stripes in the RAID group that have greater low health storage locations for data chunks than a low health configuration threshold. The low health RAID configuration may include a higher parity level than the base parity level and/or increased redundancy. Health configuration 504.n may include a high health RAID configuration for RAID stripes in the RAID group that have fewer low health storage locations for data chunks than a high health configuration threshold. The high health RAID configuration may include a lower parity level than the base parity level and/or decreased redundancy. In some embodiments, any number of health configurations 504.1-504.n and corresponding configuration thresholds or other health configuration selection criteria may defined and stored in RAID configuration 504.

In some embodiments, RAID controller 502 may be responsible for allocation of write commands and/or parity storage to implement RAID configuration 504. In some embodiments, the RAID configuration may be implemented by a separate RAID process in the write channel for the storage elements. Similarly, RAID configuration 504 may support RAID rebuild functions (not shown) implemented by RAID controller 502 or implemented by another RAID controller configured for RAID rebuild in response to a storage device failure. The remaining modules shown for RAID controller 502 may be directed to supporting the RAID write or storage process, as opposed to read or rebuild processes.

Stripe manager 506 may include a set of functions, parameters, and/or data structures for allocating RAID stripes in accordance with RAID configuration 504. For example, stripe manager 506 may receive data units to be written to the RAID group, divide the data units into data chunks for a RAID stripe and assign those data chunks to specific storage devices in the RAID group, including any parity blocks for the RAID stripe (as defined by the RAID configuration). In some embodiments, stripe manager 506 may include a plurality of hardware and/or software modules configured to use processor 220 and memory 230 to handle or manage defined operations of stripe manager 506. For example, stripe manager 506 may include storage device identifiers 506.1, chunking logic 506.2, chunk assignor 506.3, and stripe map 506.4.

Storage device identifiers 506.1 may include interfaces, functions, parameters, and/or data structures for identifying the storage devices in the RAID group for any given RAID stripe. For example, storage device identifiers 506.1 may be configured to determine the available storage devices in a RAID group receiving a data unit for storage. In some embodiments, storage device identifiers 506.1 may retrieve storage device identifiers for the RAID group from RAID configuration 504. In some embodiments, storage device identifiers 506.1 may be configured to dynamically check the status of storage devices in the RAID group to determine the stripe set of storage devices for any given RAID stripe. In some embodiments, storage device identifiers 506.1 may return a list of storage device identifiers for the stripe set of storage devices to support a RAID stripe write process for a received data unit.

Chunking logic 506.2 may include interfaces, functions, parameters, and/or data structures for dividing the received data unit (or data units) into data chunks for the RAID stripe. For example, responsive to receiving the data unit to be stored and determining the RAID configuration from RAID configuration 504 and stripe set of storage devices from storage device identifiers 506.1, chunking logic 506.2 may divide the data unit into an appropriate number of data chunks. In a RAID group with four storage devices and requiring one data chunk for parity, the data unit may be divided in to three host data chunks and one parity data chunk (calculated from the three host data chunks). In some embodiments, chunking logic 506.2 may implement chunk size and chunking algorithm parameters from RAID configuration 504 in determining the size of the data chunks and how the data unit is divided among them. In some embodiments, chunking logic 506.2 may return the set of data chunks corresponding to the RAID stripe for that data unit. In some embodiments, chunking logic 506.2 may return only the host data chunks and an identification of the parity chunks that need to be calculated from the host data chunks (e.g., by the storage device(s) that will store the parity data). For example, host data chunks may be written to a buffer memory with a set of buffer locations identifying each data chunk.

Chunk assignor 506.3 may include interfaces, functions, parameters, and/or data structures for assigning the data chunks in the RAID strip to the storage devices in the stripe set. For example, chunk assignor 506.3 may assign the storage device identifiers for the stripe set to the data chunks from chunking logic 506.2 such that each storage device receives a single data chunk of the RAID stripe. In some embodiments, chunk assignor 506.3 may include assignment logic for determining which storage devices should receive which data chunks. For example, chunk assignments may be randomly distributed, distributed using a round-robin order, or using other algorithms. Parity data may be distributed similar to the host data chunks or may be assigned specifically to one or more storage devices designated as parity devices. In some embodiments, parity data may be calculated and stored as parity data chunks in the parity storage devices assigned by chunk assignor 506.3. In some embodiments, chunk assignor 506.3 may return a list of data chunks or data chunk identifiers and their assigned storage device identifiers.

Stripe map 506.4 may include interfaces, functions, parameters, and/or data structures for providing RAID stripe information for the data in one or more RAID groups. For example, stripe map 506.4 may include the storage device identifiers for each data chunk for each RAID stripe in a RAID group. In some embodiments, stripe map 506.4 may include a logical block address (LBA) for each data chunk in the storage device storing the data chunk and the LBA may be used for reading, retrieving, and/or rebuilding the data chunk after it is written to the storage device. For example, stripe manager 506 may receive or assign the LBA for each data chunk and provide the LBA with the write command. Each storage device may maintain a logical to physical storage location map to allow the LBA to be used by RAID controller 502 and other host or storage management application to locate the target data, while allowing each storage device 518 to physically locate the data corresponding to the LBA in memory die(s) 540.

In some embodiments, stripe map 506.4 may include the RAID stripe information for each stripe on each storage device in the set of storage devices that makeup the RAID group. RAID stripe information may include logical address and/or logical mapping information for each storage device and/or key information or algorithms for accessing or calculating the physical locations of each RAID stripe across the storage devices. For example, a RAID stripe distributed across three storage devices may include a first segment on a first drive, a second segment on a second drive, and corresponding parity data on a third drive and the RAID stripe information in stripe map 506.4 will enable RAID controller 502 to access the segments and parity information on any remaining drives to attempt to rebuild the RAID stripe after a failure of one of the three drives.

Health allocator 508 may include a set of functions, parameters, and/or data structures for allocating health condition indicators to write commands for each data chunk and storage device for a RAID stripe. For example, health allocator 508 may receive and organize memory device health conditions against available storage locations to determine how each RAID stripe should be allocated to manage the use of low health condition storage locations. In some embodiments, health allocator 508 may include a plurality of hardware and/or software modules configured to use processor 220 and memory 230 to handle or manage defined operations of health allocator 508. For example, health allocator 508 may include device data collector 508.1 (and related storage locations 508.2 and device health conditions 508.3 data), health directive table 508.4, and health allocation logic 508.5.

Device data collector 508.1 may include interfaces, functions, parameters, and/or data structures for receiving or accessing storage device data to be used in allocating device health conditions to data chunk write commands. For example, available storage locations and corresponding memory device health data may be received from each storage device based on periodic queries, scheduled broadcasts from the storage devices, and/or use of a storage management services that collects and aggregates storage device operating parameter data, organizes it in a data store, and makes it accessible to other storage services (such as device data collector 508.1). In some embodiments, device data collector 508.1 may periodically receive an assessment of the number and/or size of available storage locations 508.2 for receiving data chunks. For example, each storage device may periodically report or respond to a query regarding available storage. In some embodiments, device data collector 508.1 may periodically receive an assessment of the memory device health conditions 508.3 corresponding to at least the available storage locations 508.2. In some embodiments, storage devices and/or device data collector 508.1 may bound or size storage locations based on a predetermined chunk size for RAID data chunks and map corresponding memory device storage space, such as a number of zones, blocks, words, etc. and a count how many dies or similar memory device units if storage locations are allocated across such memory device units. The storage device data collected by device health collector 508.1 may be used by health allocator 508 to build health directive table 508.4 and support execution of health allocation logic 508.5. In some embodiments, device data collector 508.1 returns storage locations 508.2 and memory device health conditions 508.3 data that health allocator 508 populates into health directive table 508.4.

Health directive table 508.4 may be an example data structure for organizing the memory device health condition data collected by device data collector 508.1. For example, health directive table 508.4 may aggregate a number of health condition types available in each storage device in the RAID group. In some embodiments, each column of health directive table 508.4 may represent the collected storage device data for each storage device and initial rows may be used to organize storage location counts corresponding to memory device health conditions. For example, a simple memory device health condition configuration may track "good health" and "low health". Good health may correspond to storage locations (and corresponding memory devices) that have not met any low health thresholds and appear to be operating in good health. Low health may correspond to storage locations (and corresponding memory devices) that have met at least one low health threshold and may be assessed to have a higher risk of failure or data loss. In the first two rows, the number of available good health storage locations and the number of low health storage locations may be listed for each storage device.

In some embodiments, health directive table 508.4 may include directive data based on the possible combinations of health conditions across storage devices. For example, based on the total low health and good health storage locations available in each storage device, determine the combinations of health conditions that could be selected for a given RAID stripe. For example, in a simplified array with only two storage devices per stripe, the combinations could be good health storage locations on both storage devices, good health on the first device and low health on the second device, low health on the first device and good health on the second device, or low health on both devices. As the number of health condition types and the number of storage devices in the stripe set increase, the number of combinations to evaluate may also increase. Based on the number of good health and low health storage locations available on each storage device, storage locations may be allocated with specified memory health conditions to balance the risk that low health storage locations represent. Health allocation logic 508.5 may determine which combinations are prioritized and/or acceptable and populate health directive table 508.4 with the combinations of health conditions that may be assigned to the data chunks for each RAID stripe as it is written.

Health allocation logic 508.5 may include interfaces, functions, parameters, and/or data structures for selecting combinations of device health conditions for each RAID strip to allocate device health conditions to data chunk write commands. For example, health allocation logic 508.5 may operate in conjunction with health directive table 508.4 to select the acceptable combinations of device health conditions and prioritize which combinations should be used for RAID stripes. In some embodiments, health allocation logic 508.5 may be configured to use RAID configuration 504 to determine the acceptable combinations of health conditions. For example, each RAID stripe will include a stripe set of storage devices with a number n. RAID configuration 504 may determine a maximum number of allowable failures max. Health allocation logic 508.5 may reject any combination of health conditions that include more low health storage locations than max. Put another way, a minimum number of good health locations min may preferentially be allocated to each RAID stripe, where min=n−max. Further, health allocation logic 508.5 may be configured to distribute low health storage locations across as many RAID stripes as possible to minimize concentrations of low health storage locations in any given stripe (even if the concentrations would still be below max.) For example, if the total number of low health storage locations across all storage devices is less than the total number of RAID stripes to be written to the RAID group, then a single low health storage location may be allocated each RAID stripe until no low health storage locations remain (and any remaining RAID stripes will consist of only good health storage locations). In some embodiments, the selected combinations of health conditions may be populated into health directive table 508.4 for a given set of RAID stripes (such as the total RAID stripes that will fit in the available space of the RAID group).

In a simple example with two memory health conditions and two storage devices that can accommodate 1000 RAID stripes, the first storage device includes 100 low health storage locations and 900 good health storage locations. The second storage device includes 150 low health storage locations and 850 good health storage locations. n is 2, max is 1, and min is 1. Combinations including low health storage locations in both storage devices are excluded (for violating max=1). The resulting acceptable combinations include: 750 RAID stripes with good health storage locations on both storage devices, 100 RAID stripes with low health on the first storage device and good health on the second storage device, and 150 RAID stripes with good health on the first storage device and low health on the second storage device. In some embodiments, these combinations may be organized in health directive table 508.4 and a sequential number of RAID stripes or RAID stripe write commands may be associated with the combinations. For example, RAID stripes 1-750 may correspond to the good/good RAID stripes, RAID stripes 751-850 may correspond to the bad/good RAID stripes, and Raid stripes 851-1000 may correspond to good/bad RAID stripes.

In some embodiments, health allocation logic 508.5 may be invoked by health allocator 508 to populate health directive table 508.4 with acceptable health condition combinations in response to receiving or calculating available storage locations 508.2 and device health conditions 508.3. Health allocator 508 may then select a combination of health conditions from health directive table 508.4 when processing a RAID stripe write operation and remove that combination from health directive table 508.4 or indicate that the health condition combination has been used in health directive table 508.4. In some embodiments, health allocator 508 may return the health condition types of each storage device for a target RAID stripe to be used by health write command 510.

Health write command 510 may include a set of interfaces, functions, parameters, and/or data structures for initiating the individual data chunk (including parity) write commands to the stripe set of storage devices for a target RAID stripe. Health write command 510 may differ from other RAID chunk write commands in that it communicates the target health condition for the storage location in the storage device receiving the command. For example, health write command 510 may include a write parameter that includes the health condition type or value for the physical storage location in which the storage device will store the data chunk. In some embodiments, health write command 510 may include a health condition indicator in the write command parameters that may be parsed by the storage device. The storage device, such as storage device 518, may be configured to identify the health condition indicator and select a physical storage location corresponding to the health condition indicator from its available storage locations. The storage device may map the LBA for the data chunk to the physical storage location and return an appropriate write command complete message. In some embodiments, the storage device may return an error message in the event that the requested health condition type is not longer available in the storage device media.

Device controller 520 may be an onboard controller with related processor, memory, bus, physical interfaces, and other components for managing the operation of storage device 518. For example, device controller 520 may be an NVMe device controller with a PCIe interface to storage node 30 and may be configured for drive operations according to standard and proprietary protocols for reading and writing data on non-volatile memory dies 540. Device controller 520 may also support various storage device configuration and management operations for non-volatile memory dies 540, the data stored thereon, and the collective hardware and software functions of the components of storage device 518. In some embodiments, device controller 520 and NVM dies 540 may be packaged as a drive unit with a defined physical interface for communicating with other components of storage system 500.

Device controller 520 may include a plurality of functional modules instantiated in the memory (not shown) for execution by the processor (not shown) of storage device 518 and/or device controller 520. For example, device controller 520 may include a memory health monitor 522 configured to monitor one or more memory device health values for memory dies 540 and/or subunits thereof. Device controller 520 may include a health function 524 configured to determine a health condition for memory devices, such as memory dies 540 and/or subunits thereof. Device controller 520 may include a health map 526 configured to store the health condition values for memory devices, such as memory dies 540 and/or subunits thereof. Device controller 520 may include a storage management interface 528 configured to expose storage device data for storage device 518 to one or more storage management systems, such as RAID controller 502. Device controller 520 may include a storage manager 530 configured to manage the processing of read, write, and other data storage commands to memory devices in the storage device, such as memory dies 540. Device controller 520 may include a memory device interface 532 for connecting to memory devices, such as memory dies 540.

Memory health monitor 522 may include a set of interfaces, functions, parameters, and/or data structures for monitoring health parameters for the memory devices of storage device 518, such as NVM dies 540 and subunits thereof. For example, memory health monitor 522 may be configured to monitor a set of parameters at various hierarchical levels in the organization of the NVM storage structure in memory dies 540. In some embodiments, memory health monitor may monitor a plurality of NVM parameter values based on the write and read performance of storage units in NVM dies 540. For example, memory health monitor 522 may be configured to monitor program erase (PE) cycle values 522.1, program loop count (PLC) values 522.2, bit error rate (BER) values 522.3, soft bit/hard bit (SB/HB) decoding values 522.4, and/other NVM parameter values. Program erase cycle values 522.1 may include a count of the number of times the storage unit has been programmed and erased. Program loop count values 522.2 may include a count of the number of program loops used by the NVM to successfully program the storage unit. Bit error rate values may include how many bits an error correction code engine corrected while reading the storage unit. Soft bit/hard bit values may include a value or flag identifying what type of decoding was used in a most recent read operation on the storage unit, where soft bit decoding may indicate a higher BER or other difficulty decoding data from the storage unit.

In some embodiments, memory health monitor 522 may be configured to monitor NVM parameter values at various levels of storage units in NVM dies 540. For example, one or more NVM parameters may be monitored at the NVM die level, zone level (group of blocks on a die), block or page level, word line level, or another hierarchical grouping of related storage space based on the physical structure and/or read/write process of the storage device. Each level may correspond to a type of storage units (or memory subunits) within the NVM devices. In some embodiments, different parameters may be monitored at different levels. Memory health monitor 522 may store parameters at one or more levels and provide aggregate values when another module or subsystem uses parameter values for a higher-level storage unit. In some embodiments, memory health monitor 522 may return arrays of parameter values organized against identifiers for the storage units to which the parameter values relate. Memory health monitor 522 may return separate arrays for each parameter type or further organize a plurality of parameter values for a storage unit by parameter type.

Health function 524 may include a set of interfaces, functions, parameters, and/or data structures for determining at least one health condition for a storage unit based on health parameters monitored by memory health monitor 522. For example, health function 524 may include logic for evaluating one or more health parameters against one or more related threshold values to determine whether a defined health condition is met. In some embodiments, health function 524 may define at least one threshold value for each parameter type used to determine the health condition. For example, a health condition may be based on PE cycle values 522.1, PLC values 522.2, BER values 522.3, and/or SB/HB values 522.4 and health function 524 may include a PE cycle threshold 524.1, a PLC threshold 524.2, a BER threshold 524.3, and/or SB/HB threshold value 522.4.

In some embodiments, one or more parameter evaluations may be used to determine a health condition value for the storage unit, such as a good health condition (representing normal or acceptable reliability of operation) or a low health condition (representing a decreased reliability of operation. In some embodiment, more complex evaluations of parameter values may be used to determine decreased reliability and/or more than two health condition values may be determined from the evaluations. For example, health condition values could be based on a reliability rating system with ranked values, such as a scale from 1-10 or using a decimal system where 1 represents ideal reliability, 0 represents failure, and a reliability percentage is provided in decimal form (0.9 for 90%, etc.). In some embodiments, threshold values may be based on a variance calculation from a population of similar storage devices and/or determined from experimental and/or field data related to memory device reliability and/or failure data. In some embodiments, health function 524 may define a plurality of evaluative tests that compare parameter values to threshold values and health function 524 may further include aggregate health logic 524.5 for determining health conditions based on a plurality of threshold tests and/or related storage units. In some embodiments, a group of parameter tests for a storage unit may result in a single health condition. For example, aggregate health logic 524.5 may provide evaluative logic where, responsive to any parameter value meeting or exceeding the corresponding threshold value, aggregate health logic 524.5 may indicate that a first health condition is met (and that health condition value should be assigned). A second health condition may be met only if none of the threshold values are met. For example, a storage unit may be classified as having a good health condition if no parameter thresholds for decreased performance or reliability are met and a low health condition if any parameter threshold for decreased performance or reliability is met. In some embodiments, aggregate health logic 524.5 may include a health weightage function that uses a plurality of parameters and corresponding threshold values to determine one or more health conditions using weighting factors for different parameters and/or thresholds to determine the aggregate health condition for the storage unit.

In some embodiments, aggregate health logic 524.5 may also provide evaluative logic for aggregating health conditions across storage units of the same level that contribute to a higher-level storage unit of interest. For example, a storage location for the data chunk of a RAID stripe may occupy a plurality of write blocks distributed across multiple dies. Aggregate health logic 524.5 may include aggregate health logic for evaluating the plurality of health conditions in the storage units within the storage location to provide an aggregate health condition for the storage location. In some embodiments, the storage location health condition value may equal the worst health condition of the storage units making up the storage location. For example, a storage location may include four blocks distributed across two dies. If any of the four blocks has a low health condition, the storage location may be treated has having a low health condition. Because loss of any significant portion of the data chunk may result in the data chunk being unrecoverable or, at least, unreliable, the storage location is assigned the worst health condition of any participating storage unit. Note that storage unit level may matter and the logic for aggregation of different groups of storage units may vary and be reflected in the configuration of aggregate health logic 524.5.

Health map 526 may include a set of interfaces, functions, parameters, and/or data structures for associating the health condition values from health function 524 with the corresponding storage units. For example, health map 526 may include one or more tables, arrays, databases, or similar structures for storing health condition values corresponding to storage unit identifiers. In some embodiments, health map 526 may be organized hierarchically using a logical structure that parallels the physical structure of storage unit types 526.1 that make up the NVM media. For example, the dies, block zones, erase blocks, and word lines of the NVM media may be represented as storage unit types 526.1 in health map 526 and associated with health condition values where those values have been determined. In some embodiments, undetermined storage units may be assumed to have a default health condition value, such as a good condition. In some embodiments, health map 526 may enable storage management interface 528 to determine health conditions per storage location. For example, one of the levels represented in health map 526 may correspond to aggregate health condition values for storage locations meeting the data chunk sizes for RAID stripes, where aggregate health logic 524.5 has been used to determine the aggregate health condition for the storage units corresponding to each storage location. In some embodiments, health map 526 may determine or enable storage management interface 528 to determine the counts of storage locations corresponding to each health condition value. For example, a health condition counter function may be run against the data structure of health map 526 to determine the good condition storage location count and the low condition storage location count.

Storage management interface 528 may include a set of interfaces, functions, parameters, and/or data structures for reporting storage device operating parameters to a storage management service or directly to a storage management function. For example, storage management interface 528 may summarize and report available storage location data 528.1 and corresponding health condition data 528.2 to RAID controller 502 for use by stripe manager 506 and/or health allocator 508. In some embodiments, storage management interface 528 may use a standard data reporting scheme, such as self-monitoring, analysis, and reporting (SMART) data feeds to report the available storage location data 528.1 and health condition data 528.2 to a storage device data aggregation service and/or directly to RAID controller 502. For example, storage management interface 528 may broadcast SMART compliant data on a periodic basis. In some embodiments, storage management interface 528 may include an API that enables RAID controller 502 to periodically query storage management interface 528 for the storage device data of interest to RAID controller 502, such available storage location data 528.1 and health condition data 528.2.

Storage manager 530 may include a set of interfaces, functions, parameters, and/or data structures for managing read and write operations to the storage media of storage device 518, such as NVM dies 540. For example, storage manager 530 may handle read, write, delete, and other storage operations to logical or physical storage locations within storage device 518. In some embodiments, storage manager 530 may include a logical/physical map 530.1 that provides logical/physical indirection and mapping for enabling storage manager 530 to manage physical storage locations independent of the logical storage locations specified by write commands from RAID controller 502 or another storage controller. For example, logical/physical map 530.1 may include a flash translation layer (FTL) for associating logical block addresses with physical storage locations in the storage media. In some embodiments, the storage locations used by RAID controller 502 may correspond to one or more LBAs maintained in logical/physical map 530.1 and the LBAs may correspond, through logical/physical map 530.1, to one or more storage units in the physical storage structure of the NVM media of storage device 518.

Storage manager 530 may be configured for handling various storage commands, such as read, write, and delete commands, and command parameters related to those commands. In some embodiments, storage manager 530 may include a health write handler 530.2 configured to handle write commands that include a health condition parameter, such as a health condition indicator value. For example, health write handler 530.2 may include logic for identifying a health condition parameter in a received write command, parsing the health condition indicator value from the health write command, and passing the health condition indicator value to storage location selector 530.3. Storage location selector 530.3 may be configured to select a physical storage location for an incoming write request. In some embodiments, storage location selector 530.3 may accept the health condition indicator value as a parameter or argument for filtering the available storage locations to include only storage locations meeting the health condition indicated by the health condition indicator value. For example, a health write command may include either a good health condition indicator value or a low health condition indicator value. Storage location selector 530.3 may select a physical storage location comprised of storage units with an aggregate good health condition for a good health condition indicator value and a physical storage location comprised of storage units with an aggregate low health condition for a low health condition indicator value.

Memory device interface 532 may include a physical interface and corresponding protocols for communication between device controller 520 and one or more NVM media devices including memory dies 540. For example, memory device interface 532 may include a flash bus interface for providing multi-channel communication with the NVM media devices in storage device 518.

Memory 230 and/or device controller 520 may include additional logic and other resources (not shown) for processing RAID and storage management requests, such as modules for generating, queueing, and otherwise managing storage, management, and rebuild requests. Processing of a RAID stripe command by RAID controller 502 and/or device controller 520 may include any number of intermediate steps that yield at least one write command to the memory devices of storage devices participating in the RAID storage request, including both host data and parity data writes.

Figure 6:
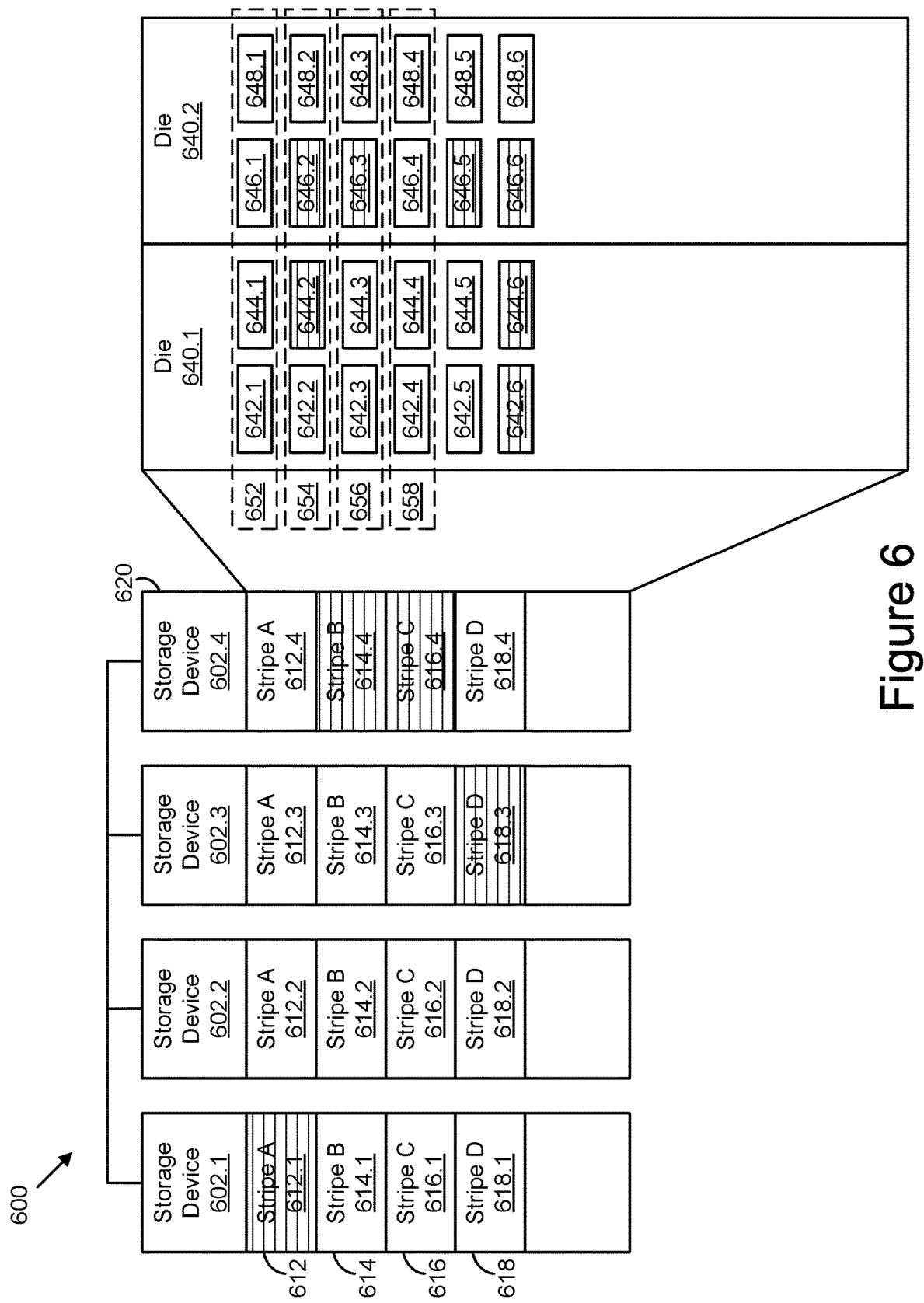
FIG. 6 schematically illustrates an example RAID array and the allocation of data chunks based on memory device health conditions.

FIG. 6 shows an example RAID storage system 600 that includes storage devices 602.1-602.4 configured for health condition writes that assure no more than one storage device uses a low health condition storage location for any given RAID stripe. Each RAID stripe 612, 614, 616, 618 includes data chunks 612.1-612.4, 614.1-614.4, 616.1-616.4 distributed across storage devices 602.1-602.4. In the example shown, hatched data chunks 612.1 in stripe A, 614.4 in stripe B, 616.4 in stripe C, and 618.3 is stripe D represent storage locations with low health conditions. The remaining data chunks with no hatching represent storage locations with good health conditions.

Without the health write process described below, storage locations may be randomly assigned (in terms of storage location health condition) and any give RAID stripe may end up with multiple data chunks stored in low health condition storage locations. For example, the data chunk 616.3 of stripe C in storage device 602.3 could have been written to the storage location of data chunk 618.3 of stripe D, resulting in both data chunks 616.3 and 616.4 in stripe C being low health condition storage locations. Assuming the maximum number of allowable failure for the RAID configuration is only one, using two low health condition storage locations for the same RAID stripe may greatly increase the risk of multiple failures and resulting data loss. In some RAID configurations, at least one storage device or one data chunk per RAID stripe may include parity data for the other data chunks. For example, storage device 602.4 may be configured as parity storage device 620.

The example of FIG. 6 may further show how storage location health condition may be determined of an aggregate of storage units that make up that storage location. In the example shown, storage device 602.4 may include a plurality of block storage units 642.1-642.6, 644.1-644.6, 646.1-646.6, and 648.1-648.6 configured across two NVM dies 640.1 and 640.2. Each storage location for a data chunk may span four block storage units, that is, the aggregate size of the four blocks is at least as large as the data chunk size. Again, blocks with hatching may have low health conditions and blocks without hatching may have good health conditions. Storage location 652 may correspond to block storage units 642.1, 644.1, 646.1, and 648.1, all of which have a good health condition, resulting in the storage location for data chunk 612.4 having a good health condition. Storage location 654 may correspond to block storage units 642.2, 644.2, 646.2, and 648.2, where block storage units 644.2 and 646.2 have low health conditions, resulting in the storage location for data chunk 614.4 having a low health condition. Storage location 656 may correspond to block storage units 642.3, 644.3, 646.3, and 648.3, where block storage unit 646.3 has a low health condition, resulting in the storage location for data chunk 616.4 having a low health condition. Storage location 658 may correspond to block storage units 642.4, 644.4, 646.4, and 648.4, all of which have a good health condition, resulting in the storage location for data chunk 618.4 having a good health condition.

Figure 7:
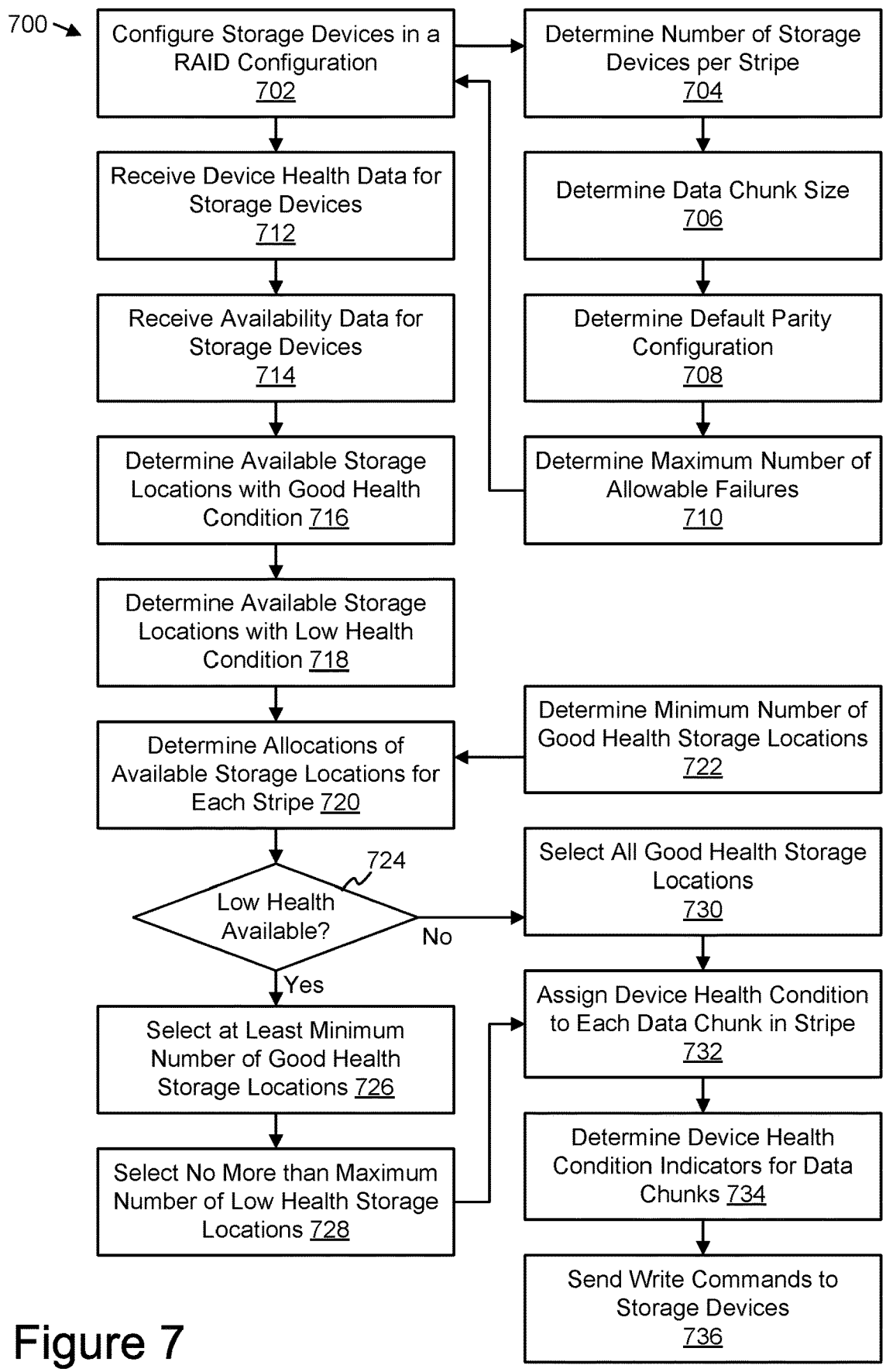
FIG. 7 illustrates an example method of allocating data chunks in a RAID stripe based on memory device health conditions.

As shown in FIG. 7, the storage system 500 may be operated according to an example method of allocating data chunks in a RAID stripe based on memory device health conditions, i.e. according to the method 700 illustrated by the blocks 702-736 of FIG. 7.

At block 702, storage devices may be configured in a RAID configuration. For example, a RAID controller may be configured for at least one RAID group of storage devices.

At block 704, a number of storage devices per RAID stripe may be identified. For example, the RAID controller may include a RAID configuration that defines the number of storage devices in the stripe set for each RAID stripe.

At block 706, a data chunk size may be determined. For example, the RAID controller may include a RAID configuration that defines the data chunk size for each RAID stripe and/or provides an algorithm for determining the data chunk size based on the data unit or data units to be stored in the RAID stripe.

At block 708, a default parity configuration may be determined. For example, the RAID controller may include a RAID configuration that defines at least one parity configuration for use in writing the RAID stripes, where the parity configuration determines the number of data chunks based on parity calculated from the other (host) data chunks.

At block 710, a maximum number of allowable failures may be determined. For example, the RAID type, number of storage devices in the stripe set, and the number of parity data chunks (and corresponding storage devices from the stripe set) may define a maximum number of allowable failures for the data on the failed storage devices to be reliably recovered from the remaining storage devices. In some embodiments, blocks 702-710 may be executed when a RAID group is initially configured and may not be executed again unless there is a need to reconfigure the RAID group due to a change in available storage resources, application needs, changed reliability or performance, etc.

At block 712, device health data may be received for the storage devices in the RAID group. For example, the RAID controller may collect storage device health data, such as health condition data for memory devices containing storage locations for the RAID stripes.

At block 714, availability data may be received for the storage devices in the RAID group. For example, the RAID controller may receive (or otherwise collect or determine) data values for the available storage locations in each storage device for receiving data chunks for the RAID stripes.

At block 716, available storage locations with good health conditions may be determined. For example, the RAID controller may determine a number of available storage locations with good health condition values based on the device health data and availability data received at blocks 712 and 714.

At block 718, available storage locations with low health conditions may be determined. For example, the RAID controller may determine a number of available storage locations with low health condition values based on the device health data and availability data received at blocks 712 and 714.

At block 720, the possible health condition allocations of available storage locations may be determined for each stripe. For example, the RAID controller may calculate the possible combinations of health conditions based on an available storage location from each storage device. At block 722, a minimum number of good health storage locations may be determined. For example, the RAID controller may calculate the minimum number of good health storage locations to be used for each RAID stripe based on subtracting the maximum number of allowable failures from the number of storage devices in the stripe set. The RAID controller may use the minimum number of good health storage locations to determine the possible health condition allocations at block 720.

At block 724, whether low health condition available storage locations are in the possible health condition allocations may be evaluated. For example, the RAID controller may evaluate whether there are low health condition available storage locations that need to be used for one or more RAID stripes. If yes, method 700 may proceed to block 726. If no, method 700 may proceed to block 730.

At block 726, at least a minimum number of good health storage locations may be selected. For example, the RAID controller may select an allocation of health conditions that includes at least the minimum number of good health storage locations.

At block 728, no more than the maximum number of low health storage locations may be selected. For example, the RAID controller may select an allocation of health conditions that includes no more than the maximum number of low health storage locations and, ideally, distributes the low health storage locations across as many RAID stripes as possible to avoid concentrations of low health conditions and be prepared for further degradation of health conditions (and increasing frequency of low health condition storage locations).

At block 730, all good health storage locations may be selected. For example, the RAID controller may select an allocation of all good health conditions because there are no low health condition storage locations that need to be used.

At block 732. a memory device health condition may be assigned to each data chunk in a target RAID stripe. For example, the RAID controller may use the selected allocation of health conditions to determine the memory device health condition for each data chunk and corresponding storage device.

At block 734, a device health condition indicator may be determined for each data chunk in the RAID stripe. For example, the RAID controller may select the device health condition indicator corresponding to the assigned device health condition for each data chunk and corresponding storage device.

At block 736, write commands may be sent to each storage device in the stripe set. For example, the RAID controller may send a health write command that includes the device health condition indicator value for the assigned memory device health condition corresponding to the data chunk and target storage device.

Figure 8:
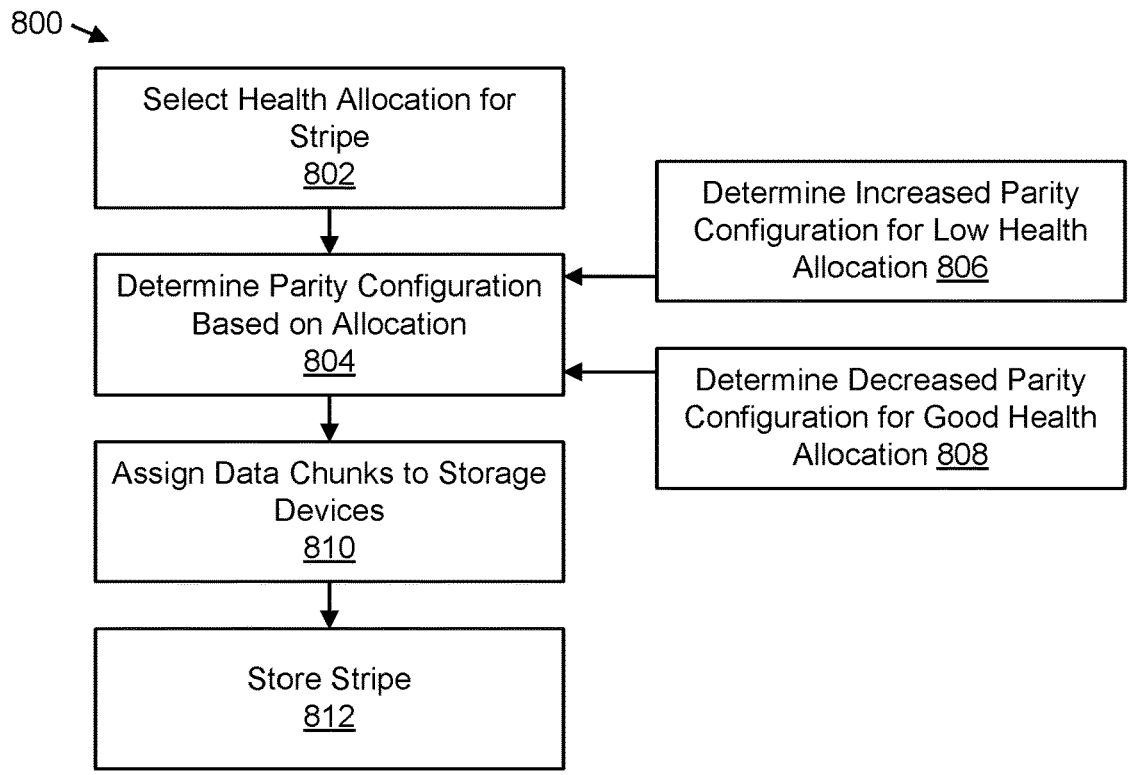
FIG. 8 illustrates an example method of changing parity configuration in a RAID stripe based on memory device health conditions.

As shown in FIG. 8, the storage system 500 may be operated according to an example method of changing parity configuration in a RAID stripe based on memory device health conditions, i.e. according to the method 800 illustrated by the blocks 802-812 of FIG. 8. In some embodiments, method 800 may operate in conjunction with method 800 in FIG. 8.

At block 802, the health condition allocation for the RAID stripe may be selected. For example, the RAID controller may select the health condition allocation for the RAID stripe as described at blocks 724-730 of method 700 in FIG. 7.

At block 804, a parity configuration for the RAID stripe may be determined based on the health condition allocation. For example, the RAID controller may determine, at block 806, an increased parity configuration should be used for a health condition allocation with low health condition storage locations in excess of an increased parity threshold number, such as exceeding the maximum number of allowable failures for the default parity configuration. In other example, the RAID controller may determine, at block 808, a decreased parity configuration should be used for a health condition allocation with low health condition storage locations meeting or below a decreased parity threshold number, such as a health condition allocation with all good health condition storage locations.

At block 810, data chunks may be assigned to the storage devices in accordance with the determined parity configuration. For example, the RAID controller may assign data chunks for the RAID stripe, including parity data chunks, based on the parity configuration determined at block 804.

At block 812, the RAID stripe may be stored. For example, each storage device may receive (or calculate) their respective data chunks to store the RAID stripe in accordance with the determined parity configuration.

Figure 9:
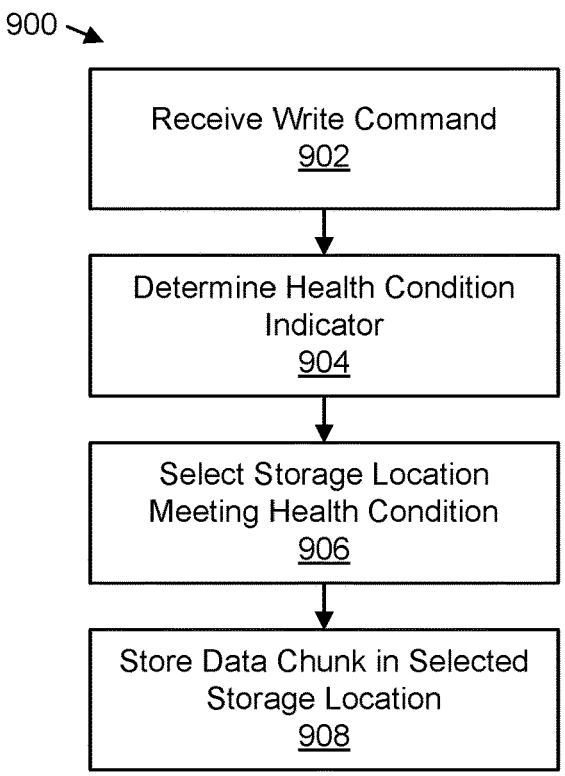
FIG. 9 illustrates an example method of handling a health condition write command in a storage device.

As shown in FIG. 9, the storage system 500 may be operated according to an example method of handling a health condition write command in a storage device, i.e. according to the method 900 illustrated by the blocks 902-908 of FIG. 9. In some embodiments, method 900 may operate responsive to the method 800 in FIG. 8.

At block 902, a write command may be received. For example, a storage device controller may receive a write command that includes a health condition parameter for selecting the physical storage location for the data in the write command based on the memory health condition of the physical storage location.

At block 904, a health condition indicator may be determined. For example, the storage device controller may parse the write command and identify a health condition indicator value that corresponds to memory device health condition.

At block 906, a physical storage location meeting the memory device health condition may be selected. For example, the storage device controller may use the memory device health condition to select physical storage units that correspond to the memory device health condition.

At block 908, the data chunk corresponding to the write command may be stored in the selected physical storage location. For example, the storage device controller may store the data chunk (host data or parity data) to the physical storage location selected at block 906.

Figure 10:
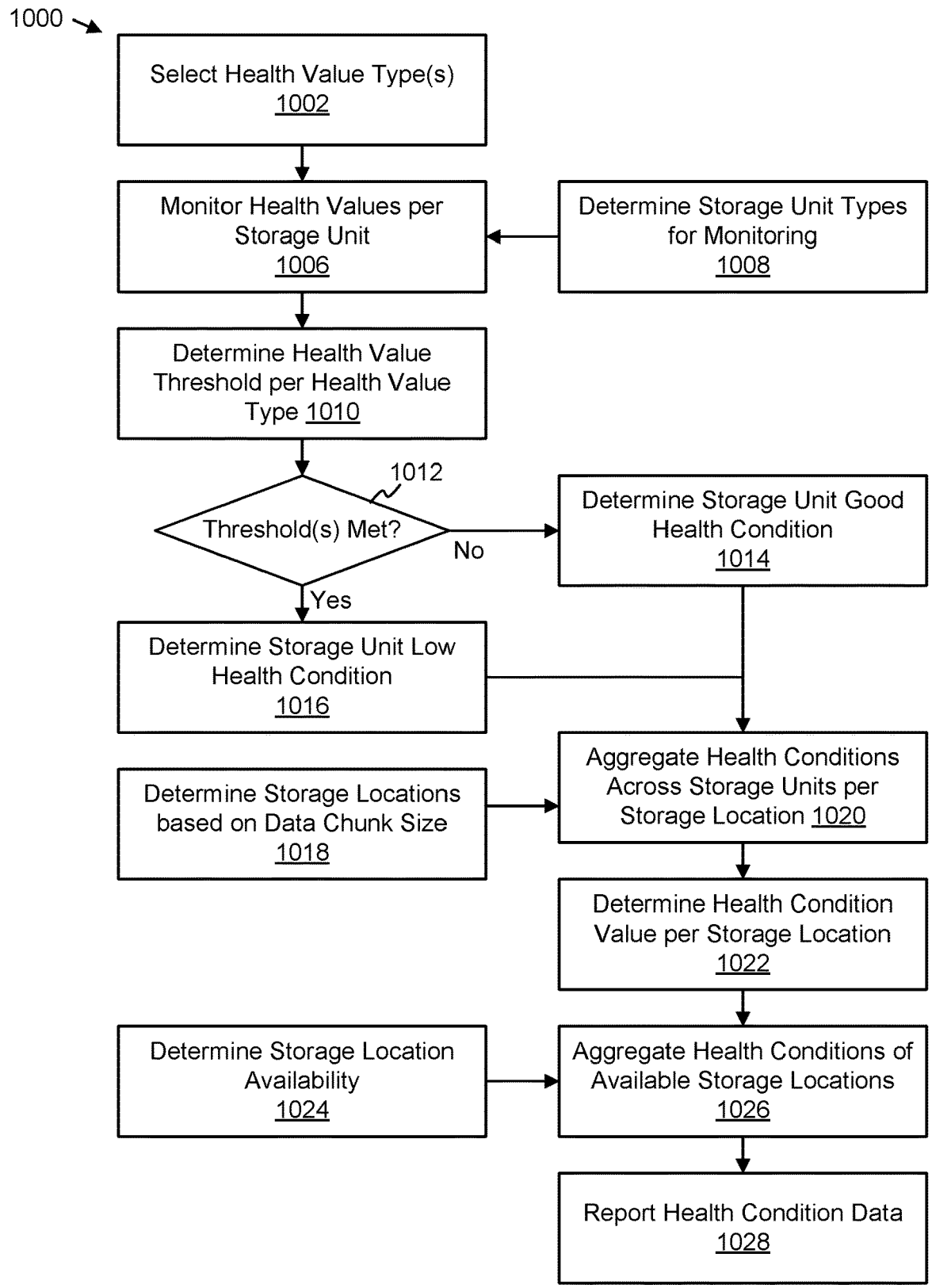
FIG. 10 illustrates an example method of determining and reporting health condition data.

As shown in FIG. 10, the storage system 500 may be operated according to an example method of determining and reporting health condition data, i.e. according to the method 1000 illustrated by the blocks 1002-1028 of FIG. 10.

At block 1002, health value types may be selected. For example, a memory health monitor may be configured to collect operating parameter values for one or more health value types, such as PE cycle values, PLC values, BER values, and/or SB/HB values.

At block 1006, health values may be monitored per storage unit. For example, the memory health monitor may monitor the health value types selected at block 1002 by collecting the parameter values for each storage unit being monitored, such as each block in the memory devices of the storage device. At block 1008, storage unit types for monitoring may be determined. For example, the memory health monitor may be configured to monitor parameter values for storage units at any level of the physical storage configuration, from memory dies to individual word lines.

At block 1010, health value thresholds may be determined for each health value type being monitored. For example, a health function may be configured with threshold values for each health value type based on variance from storage device population data or thresholds selected based on reliability and/or failure testing or field data.

At block 1012, whether any thresholds have been met may be evaluated. For example, the health function may compare parameter values related to the health value types to the corresponding health value thresholds to determine whether the thresholds are met. If not, no low health condition thresholds may be met and method 1000 may proceed to block 1014. If yes, at least one low health condition threshold may be met and method 1000 may proceed to block 1016.

At block 1014, a good health condition may be determined for the storage unit. For example, the health function may determine that a good health condition value is assigned to the storage unit being evaluated.

At block 1016, a low health condition may be determined for the storage unit. For example, the health function may determine that a low health condition value is assigned to the storage unit being evaluated.

At block 1018, storage locations may be determined for the storage device based on data chunk size. For example, the health function may be configured to determine an aggregate health condition for storage units corresponding to storage locations that may be used for data chunks of RAID stripes in a RAID configuration that the storage device supports.

At block 1020, health condition values may be aggregated across storage units that define each storage location. For example, the health function may evaluate the health condition values for the storage units corresponding to each storage location. At block 1022, a health condition value may be determined for each storage location. For example, the health function be determine an aggregate health condition value based on the health condition values of each storage unit that makes up the storage location.

At block 1024, storage location availability may be determined. For example, a storage management interface may be configured to monitor and report usage of storage space and may include parameters regarding available storage locations based on the RAID configuration, total capacity, and previously stored RAID stripes.

At block 1026, health conditions of available storage locations may be aggregated. For example, the storage management interface may determine the number of available storage locations with each health condition value, such as the number of available storage locations with a good health condition value and the number of available storage locations with a low health condition value.

At block 1028, the health condition data may be reported. For example, the health condition data, including the number of available storage locations with each health condition, may be reported to a RAID controller for use in determining health condition configurations and health write commands.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a plurality of storage devices configured in a redundant array of independent disks (RAID) configuration, wherein each storage device of the plurality of storage devices comprises a plurality of storage locations corresponding to a plurality of memory devices; and
a RAID controller configured to:
  determine a stripe set of storage devices from the plurality of storage devices to receive a target RAID stripe, wherein each storage device of the stripe set receives a data chunk corresponding to a portion of the target RAID stripe;
  assign a device health condition for each data chunk of the target RAID stripe, wherein the device health conditions are selected from:
    a first health condition corresponding to storage locations having memory health values indicating acceptable reliability of operation; and
    a second health condition corresponding to storage locations having at least one memory health value indicating decreased reliability of storage operations in an operable storage device; and
  send, to each storage device in the stripe set, a write command, wherein:
    the write command includes a write command parameter for the device health condition assigned to the received data chunk;
    the data chunks in the stripe set include:
      at least one data chunk for storage locations corresponding to the first health condition; and
      at least one data chunk for storage locations corresponding to the second health condition; and
  each storage device in the stripe set is configured to:
    determine, based on the write command parameter for the device health condition for the received data chunk, a plurality of available storage locations corresponding to at least one memory device meeting the device health conditions;
    select a storage location for the received data chunk from the plurality of available storage locations corresponding to the at least one memory device meeting the device health condition; and
    store the received data chunk in the selected storage location.

2. The storage system of claim 1, wherein:
the RAID controller is further configured to:
  receive device health data for a plurality of storage locations in each storage device of the plurality of storage devices;
  determine a first set of available storage locations in each storage device of the plurality of storage devices meeting the first health condition; and
  determine a second set of available storage locations in each storage device of the plurality of storage devices meeting the second health condition; and
assigning the device health condition for each data chunk of the target RAID stripe is based on selecting, for the target RAID stripe, a minimum number of available storage locations meeting the first health condition.

3. The storage system of claim 2, wherein the RAID controller is further configured to:
determine a maximum number of allowable failures for the RAID configuration; and
determine the minimum number of available storage locations for the target RAID stripe meeting the first health condition by subtracting the maximum number of allowable failures from a number of storage devices in the stripe set.

4. The storage system of claim 2, wherein assigning the device health condition for each data chunk of the target RAID stripe includes:
determining whether at least one storage device in the stripe set includes an available storage location in the second set of available storage locations; and
selecting, responsive to determining that at least one storage device in the stripe set includes a storage location in the second set of available storage locations, at least one storage device to receive a device health condition indicator for the second health condition.

5. The storage system of claim 2, wherein:
the RAID controller is further configured to determine allocations of available storage locations across the plurality of storage devices that meet the minimum number of available storage locations for the target RAID stripe meeting the first health condition; and
assigning the device health condition for each data chunk of the target RAID stripe further includes:
  selecting a target allocation from the determined allocations of available storage locations; and
  assigning each data chunk to a storage device in the stripe set based on the target allocation.

6. The storage system of claim 5, wherein:
assigning the device health condition for each data chunk of the target RAID stripe further includes determining, based on the target allocation, a device health condition indicator for each storage device in the stripe set and corresponding data chunk;

the write command sent to each storage device in the stripe set includes the device health condition indicator for that storage device and corresponding data chunk as the write command parameter for the device health condition; and the device health condition indicator includes a value corresponding to:
- the first health condition; or
- the second health condition.

7. The storage system of claim 1, wherein:

the RAID controller is further configured to determine, based on the assigned device health conditions for the data chunks in the target RAID stripe, a target parity configuration for the target RAID stripe;

determining the target parity configuration includes selecting the target parity configuration from a plurality of parity configurations;

each parity configuration of the plurality of parity configurations corresponds to a different allocation of device health conditions for the data chunks;

the write commands are configured according to the target parity configuration; and each storage device in the stripe set is further configured to store the received data chunk according to the target parity configuration.

8. The storage system of claim 1, wherein:

each storage device of the plurality of storage devices comprises:
- a memory health monitor configured to monitor at least one memory health value for each storage location of the plurality of storage locations; and
- a storage management interface configured to report, to the RAID controller, health condition data for each storage location of the plurality of storage locations; and assigning the device health condition for each data chunk of the target RAID stripe is based on the health condition data from each storage device of the plurality of storage devices.

9. The storage system of claim 8, wherein:

each storage device of the plurality of storage devices further comprises a health function configured to determine, based on the at least one memory health value for each storage location, a health condition value for each storage location; and the health condition data includes:
- aggregate values of available storage locations with the first health condition; and
- aggregate values of available storage locations with the second health condition.

10. The storage system of claim 9, wherein:

the at least one memory health value includes at least one health value type selected from a program-erase cycle value, a program loop counter value, a bit error rate value, and a soft bit/hard bit value;

the health function is further configured to determine the health condition value for each storage location based on:
- evaluating the at least one memory health value against a health threshold for a corresponding health value type; and
- aggregating health condition values across a plurality of storage units corresponding to a storage location;

the memory health monitor is further configured to monitor the at least one memory health value for each storage unit of the plurality of storage units;

an aggregate size of the plurality of storage units corresponding to a storage location is at least a chunk size of a target data chunk of the data chunks in the target RAID stripe;

each storage unit of the plurality of storage units corresponds to a predetermined storage unit type selected from a word line, an erase block, a block zone, and a memory die; and each storage device of the plurality of storage devices further comprises a storage manager configured to select, based on the device health condition in the write command, the storage location for the received data chunk.

11. A computer-based method, comprising:

determining a stripe set of storage devices from a plurality of storage devices configured to receive a target redundant array of independent disks (RAID) stripe, wherein:
- each storage device of the plurality of storage devices comprises a plurality of storage locations corresponding to a plurality of memory devices; and
- each storage device of the stripe set receives a data chunk corresponding to a portion of the target RAID stripe;

assigning a device health condition for each data chunk of the target RAID stripe, wherein the device health conditions are selected from:
- a first health condition corresponding to storage locations having memory health values indicating acceptable reliability of operation; and
- a second health condition corresponding to storage locations having at least one memory health value indicating decreased reliability of storage operations in an operable storage device; and sending, to each storage device in the stripe set, wherein:
- the write command includes a write command parameter for the device health condition assigned to the received data chunk;
- the data chunks in the stripe set include:
  - at least one data chunk for storage locations corresponding to the first health condition; and
  - at least one data chunk for storage locations corresponding to the second health condition; and
- each storage device in the stripe set is configured to:
  - determine, based on the write command parameter for the device health condition for the received data chunk, a plurality of available storage locations corresponding to at least one memory device meeting the device health condition;
  - select a storage location for the received data chunk from the plurality of available storage locations corresponding to the at least one memory device meeting the device health condition; and
  - store the received data chunk in the selected storage location.

12. The computer-based method of claim 11, further comprising:

receiving device health data for a plurality of storage locations in each storage device of the plurality of storage devices;

determining a first set of available storage locations in each storage device of the plurality of storage devices meeting the first health condition;

determining a second set of available storage locations in each storage device of the plurality of storage devices meeting the second health condition; and selecting, for the target RAID stripe, a minimum number of available storage locations meeting the first health condition, wherein assigning the device health condition for each data chunk is based on selecting the minimum number of available storage locations meeting the first health condition.

13. The computer-based method of claim 12, further comprising:

determining, based on a RAID configuration for the plurality of storage devices, a maximum number of allowable failures for the target RAID stripe; and determining the minimum number of available storage locations meeting the first health condition by subtracting the maximum number of allowable failures from a number of storage devices in the stripe set.

14. The computer-based method of claim 12, wherein assigning the device health condition for each data chunk of the target RAID stripe includes:

determining whether at least one storage device in the stripe set includes an available storage location in the second set of available storage locations; and selecting, responsive to determining that at least one storage device in the stripe set includes a storage location in the second set of available storage locations, at least one storage device to receive a device health condition indicator for the second health condition.

15. The computer-based method of claim 12, further comprising:

determining allocations of available storage locations across the plurality of storage devices that meet the minimum number of available storage locations meeting the first health condition, wherein assigning the device health condition for each data chunk of the target RAID stripe further includes:

selecting a target allocation from the determined allocations of available storage locations; and assigning each data chunk to a storage device in the stripe set based on the target allocation.

16. The computer-based method of claim 15, wherein:

assigning the device health condition for each data chunk of the target RAID stripe further includes determining, based on the target allocation, a device health condition indicator for each storage device in the stripe set and corresponding data chunk;

the write command sent to each storage device in the stripe set includes the device health condition indicator for that storage device and corresponding data chunk as the write command parameter for the device health condition; and the device health condition indicator includes a value corresponding to:
the first health condition; or
the second health condition.

17. The computer-based method of claim 11, further comprising:

determining, based on the assigned device health conditions for the data chunks in the target RAID stripe, a target parity configuration for the target RAID stripe, wherein:

determining the target parity configuration includes selecting the target parity configuration from a plurality of parity configurations;

each parity configuration of the plurality of parity configurations corresponds to a different allocation of device health conditions for the data chunks;

the write commands are configured according to the target parity configuration; and each storage device in the stripe set is further configured to store the received data chunk according to the target parity configuration.

18. The computer-based method of claim 11, further comprising:

monitoring at least one memory health value for each storage location of a plurality of storage locations in each storage device of the plurality of storage devices; and reporting, from the plurality of storage devices, health condition data for each storage location of the plurality of storage locations in each storage device of the plurality of storage devices, wherein assigning the device health condition for each data chunk of the target RAID stripe is based on the health condition data from each storage device of the plurality of storage devices.

19. The computer-based method of claim 18, further comprising:

determining, based on the at least one memory health value for each storage location, a health condition value for each storage location, wherein the health condition data includes, for each storage device of the plurality of storage devices:

aggregate values of available storage locations with the first health condition; and aggregate values of available storage locations with the second health condition.

20. A system, comprising:
a processor;
a memory;
a plurality of storage devices configured in a redundant array of independent disks (RAID) configuration, wherein each storage device of the plurality of storage devices comprises a plurality of storage locations corresponding to a plurality of memory devices;

means, stored in the memory for execution by the processor, for determining a stripe set of storage devices from the plurality of storage devices to receive a target RAID stripe, wherein each storage device of the stripe set receives a data chunk corresponding to a portion of the target RAID stripe;

means, stored in the memory for execution by the processor, for assigning a device health condition for each data chunk of the target RAID stripe, wherein the device health conditions are selected from:

a first health condition corresponding to storage locations having memory health values indicating acceptable reliability of operation; and a second health condition corresponding to storage locations having at least one memory health value indicating decreased reliability of storage operations in an operable storage device; and means, stored in the memory for execution by the processor, for sending, to each storage device in the stripe set, a write command, wherein:

the write command includes a write command parameter for the device health condition assigned to the received data chunk;

the data chunks in the stripe set include:
at least one data chunk for storage locations corresponding to the first health condition; and at least one data chunk for storage locations corresponding to the second health condition; and each storage device in the stripe set is configured to:

determine, based on the write command parameter for the device health condition for the received data chunk, a plurality of available storage locations corresponding to at least one memory device meeting the device health condition;

select a storage location for the received data chunk from the plurality of available storage locations corresponding to the at least one memory device meeting the device health condition; and store the received data chunk in the selected storage location.

* * * * *